(12) United States Patent
Brock et al.

(10) Patent No.: US 8,204,486 B2
(45) Date of Patent: *Jun. 19, 2012

(54) DYNAMIC MESSAGING ROUTING AND AUDIO-TO-TEXT LINKING FOR VISUAL VOICEMAIL

(75) Inventors: Brett Brock, Roswell, GA (US); Angelise Carter, Alpharetta, GA (US)

(73) Assignee: Cox Communications, Inc., Atlanta, GA (US)

( * ) Notice: Subject to any disclaimer, the term of this patent is extended or adjusted under 35 U.S.C. 154(b) by 352 days.

This patent is subject to a terminal disclaimer.

(21) Appl. No.: 12/643,595

(22) Filed: Dec. 21, 2009

(65) Prior Publication Data

US 2010/0167700 A1 Jul. 1, 2010

Related U.S. Application Data

(60) Provisional application No. 61/139,258, filed on Dec. 19, 2008.

(51) Int. Cl.
*H04L 12/58* (2006.01)
*H04M 1/725* (2006.01)
*H04M 1/663* (2006.01)
*H04M 11/10* (2006.01)
*H04M 1/64* (2006.01)
*H04M 11/00* (2006.01)

(52) U.S. Cl. ........... 455/413; 455/412.1; 455/412.2; 379/88.11; 379/88.12; 379/88.13; 379/88.14; 379/88.18; 379/88.25

(58) Field of Classification Search .... 379/88.11–88.14, 379/88.18, 88.22; 455/412.1, 412.2, 413
See application file for complete search history.

(56) References Cited

U.S. PATENT DOCUMENTS

| 6,775,651 | B1 | 8/2004 | Lewis et al. | 704/435 |
| 7,317,908 | B1 | 1/2008 | Eason | 455/413 |
| 7,978,828 | B1 | 7/2011 | Edamadaka et al. | 379/88.13 |
| 2004/0073608 | A1* | 4/2004 | Bilchev | 709/203 |
| 2006/0223502 | A1* | 10/2006 | Doulton | 455/413 |
| 2008/0273675 | A1* | 11/2008 | Siminoff | 379/88.14 |
| 2010/0158214 | A1 | 6/2010 | Gravino et al. | 379/88.14 |

OTHER PUBLICATIONS

U.S. Appl. No. 12/643,569, filed Dec. 21, 2009, entitled "Visual Voicemail", Inventor: Gravino et al.
Notice of Allowance mailed Mar. 22, 2012, in co-pending U.S. Appl. No. 12/643,569.

* cited by examiner

*Primary Examiner* — Dwayne Bost
*Assistant Examiner* — Larry Sternbane
(74) *Attorney, Agent, or Firm* — Merchant & Gould

(57) ABSTRACT

An improved visual voicemail system is provided. When a call is made to a wireless telephone device and a voicemail message is deposited for the called party, the voicemail message is transcribed to generate a text version of the deposited voicemail message. The transcribed voicemail message is sent to the called mobile telephone device to allow the user to read the text version of the voicemail message. Embedded with transcribed text voicemail message is a link that maps to a unique telephone number that is assigned to the original audio voicemail message from the text voicemail message was transcribed. If the called party selects the link, the called party's mobile telephone device or other receiving computing device places a call to the storage location of the original audio version of the voicemail message to listen to the audio version of the voicemail message.

20 Claims, 5 Drawing Sheets

| Directory Number | Internal Message ID (Index) |
|---|---|
| 4046691001 | 1 |
| 4046691002 | 2 |
| 4046691003 | 3 |
| 4046691004 | 4 |
| 4046691005 | 5 |

FIG 1B

US 8,204,486 B2

DYNAMIC MESSAGING ROUTING AND AUDIO-TO-TEXT LINKING FOR VISUAL VOICEMAIL

RELATED APPLICATIONS

This application claims the benefit of U.S. Provisional Application Ser. No. 61/139,258, filed with the U.S. Patent and Trademark Office on Dec. 19, 2008, entitled "Visual Voicemail Provisioning Providing Platform Synchronization and Message Routing," which is incorporated herein by reference. This application also is related to U.S. patent application Ser. No. 12/643,569, filed with the U.S. Patent and Trademark office on Dec. 21, 2009, entitled "Visual Voicemail" which is incorporated herein by reference.

BACKGROUND

Voicemail is a centralized system of managing telephone messages and conveying voice messages. Voicemail has become a ubiquitous feature on phone systems serving companies, cellular and residential subscribers. Cellular and residential voicemail systems are used primarily as simple telephone answering systems.

The next development in messaging has been making text messaging real-time, rather than asynchronous store-and-forward delivery into a mailbox. Text messaging requires being able to detect device connectivity to the Internet and contact recipient "availability" status to exchange real-time messages, as well as, personalized directories that allow a predetermined group of people to find out a user's status and initiate a real-time text messaging exchange. Instant Messaging has since evolved into more than short text messages, but now can include the exchange of data files, such as documents, pictures, etc., and the escalation of the contact into a voice conversational connection.

The increase in wireless mobility, originally through cellular services and today through IP-based Wi-Fi, was also a driver for messaging convergence with mobile telephony. These capabilities not only foster the use of speech user interfaces for message management, but increase the demand for retrieval of voice messages integrated with email. In addition, users may reply to both voice and email messages in voice rather than text. New services are beginning to blur the boundaries between voicemail and text by delivering voicemails to mobile phones as SMS text messages.

Visual Voicemail involves the addition of a visual aspect to phone voicemail to allow users to view a list of audio voicemail entries or even read transcriptions of voicemail. Systems have been developed for providing a transcript of a received voicemail message to a user to allow the user to read a text version of the received voicemail message. However, such systems require a data service on the user's mobile device, and thus, preclude the functionality from users who do not subscribe to data plans. In addition, provisioning visual voicemail as a data service creates complexity and requires determining how to handle situations wherein the customer is not in a data coverage area. This includes determining how to handle synchronization between the handset and the voicemail system as it moves in and out of data coverage, and also how service providers deal with their roaming partners. For example, a data roaming agreement may not be in place with all providers. Furthermore, a significant portion of subscribers may use first generation mobile handsets that have poor data throughput connections. Thus, when first generation mobile handsets are in data coverage, the upload of the data for the handset is slow thereby making the service a bad experience for the user. Another problem involves having two data stores for voicemail messages. If a customer plays a message and then deletes it, a synchronization routine has to be performed that requires the third party vendor to provide a notification to the voicemail system side to also delete that same message.

It is with respect to these and other considerations that the present invention has been made.

SUMMARY

Embodiments of the present invention solve the above and other problems by providing an improved visual voicemail system. When a call is made to a wireless telephone device and a voicemail message is deposited for the called party, the voicemail message is transcribed to generate a text version of the deposited voicemail message. The original audio voicemail message and the transcribed text version of the voicemail message are stored. A unique telephone number is assigned to each stored audio voicemail message, and the original audio voicemail message, the text version of the original voicemail message and the unique telephone number are mapped together via a pool of voicemail-to-telephone number mappings.

The transcribed voicemail message is sent to the called text-enabled telephony device to allow the user to read the text version of the voicemail message. Alternatively, the transcribed voicemail message may be sent to a computing device accessible via a distributed computing system, such as the Internet or such as a cable television services system. The text version of the voicemail message may be sent to the called party's mobile telephone device via a number of suitable transmission means, such as SMS, MMS, IM, HTTP Push and electronic mail.

Embedded with the transcribed text voicemail message is a link that maps to the unique telephone number that was assigned to the original audio voicemail message from which the text voicemail message was transcribed. If the called party selects the link, the called party's telephony device or other receiving computing device places a call directly via the assigned telephone number to the storage location of the original audio version of the voicemail message from which the received text voicemail message was transcribed. The user/called party is then allowed to listen to the original audio voicemail message without having to go through the voicemail system associated with the user's mobile telephone device and without having to cycle through other stored voicemail messages or navigate one or more menus.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

FIG. 1B is a diagram of a database providing a pool of directory numbers mapped to corresponding voicemail messages.

DETAILED DESCRIPTION

Figure 1:
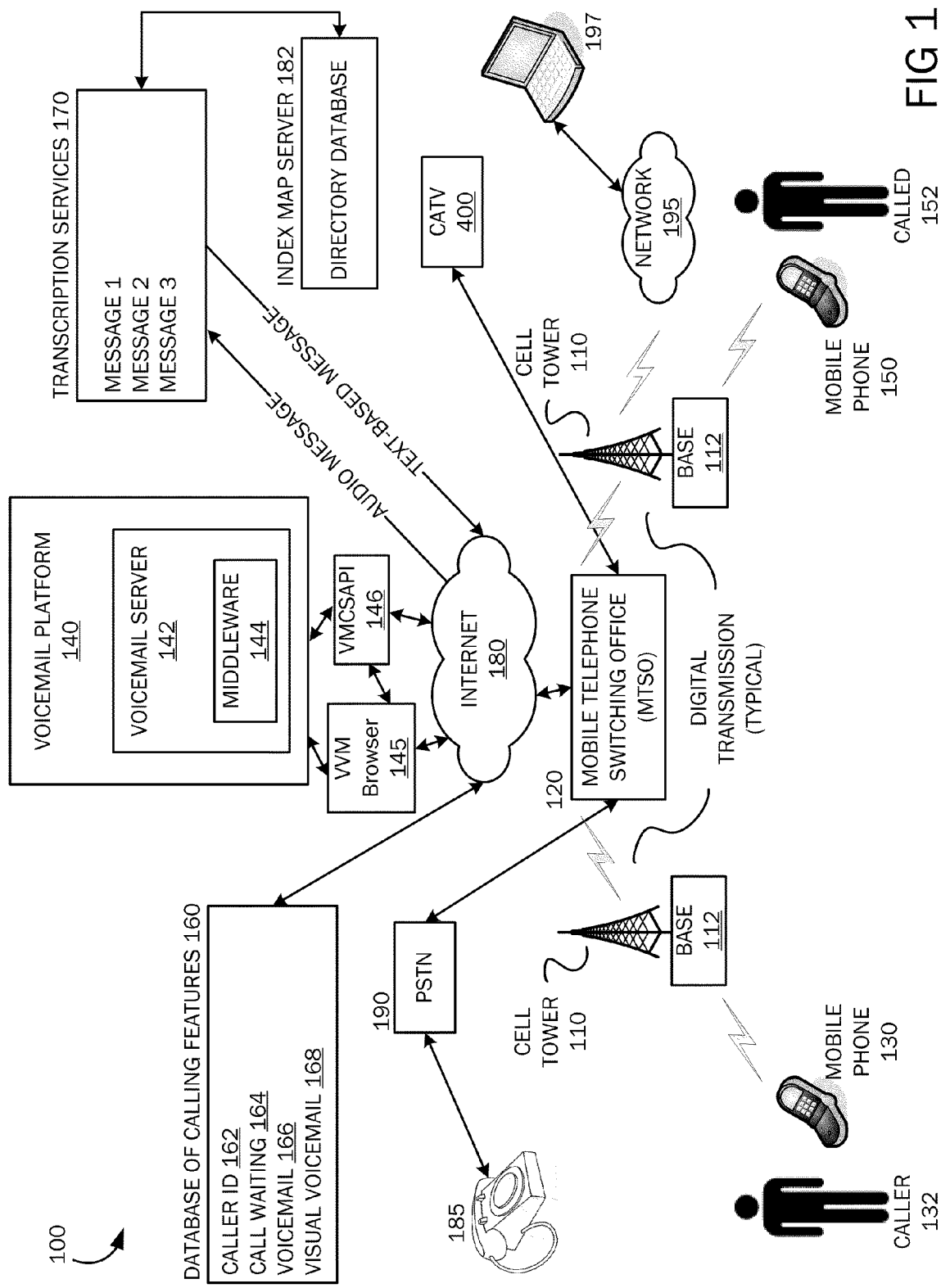
FIG. 1 is simplified block diagram illustrating a wireless communication network architecture that serves as an exemplary operating environment for the present invention.

As briefly described above, embodiments of the present invention are directed to providing a direct voicemail message playback to a receiving party via a visual voicemail system where the voicemail message playback is associated with a text version of the voicemail message previously passed to the receiving party for review. As will be described below, according to embodiments, a wireless telephone services customer may provision a direct voicemail retrieval service on a wireless communication device where a voicemail message may be transcribed and may be sent directly to the wireless customer for review as a text-based message, and where the user may then retrieve the original audio message from which the text-based message was transcribed for direct playback without having to access a voicemail system and cycle through various prompts and stored messages.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is simplified block diagram illustrating a wireline, wireless and networked communication/services architecture 100 that may serves an exemplary operating environment for the present invention. As should be understood, the example communication/services network architecture illustrated in FIG. 1 is for purposes of example and is not limiting of a variety of communications configurations that may be utilized as described herein. Referring now to FIG. 1, wireless communication services are provided by various service provider companies through a wireless network. As is known to those skilled in the art, wireless networks/services may consist of but not be limited to cellular towers 110, base stations 112, Mobile Telephone Switching Office (hereafter referred to as "MTSO") 120, and an application server 142. As should be appreciated, wireless communications may also be accomplished via Internet Protocol (IP) based systems and wireless fidelity (Wi-Fi) based systems via distributed computing networks such as the Internet.

As is known to those skilled in the art, a cellular tower 110 typically consists of a steel pole or lattice structure outfitted with antennae for transmitting and receiving signals to and from wireless devices (for example, mobile phone, personal digital assistant (PDA), smart phone, etc.), other cellular towers, and the MTSO. Each cellular tower 110 may have multiple sets of antenna mounted, depending upon how many different service providers use the tower 110.

The base 112 of each cellular tower 110 may include sets of transmitters and receivers from each service provider having antennae mounted to the tower 110. As a unit, the cellular tower 110 and the base 112 form a system capable of transmitting, receiving, and managing data. This data may consist of, but not be limited to, voice, text, and/or electronic media. As is understood by those skilled in the art, wireless systems typically operate at various frequencies (e.g., across a frequency range from 800 megahertz (MHz) to 1900 MHz), depending upon which wireless technology is utilized. According to the embodiments of the present invention, a visual voicemail (VVM) system may operate across this typical network of wireless systems, and therefore in the same frequency ranges.

Referring still to FIG. 1, a wireless network may also employ the use of a wireless electronic communication devices 130,150 (e.g., mobile phone, personal digital assistant (PDA), smart phone, etc.) capable of sending and receiving communications in the same frequency range as the wireless communications system. The term "mobile device" will be used herein to describe a wireless electronic communication device capable of sending and receiving wireless communications. As is understood by those skilled in the art, mobile devices 130,150 may comprise, but are not limited to, internal circuit boards, antennae, liquid crystal displays (LCD), keyboards, microphones, speakers, and batteries. All of these components and systems making up mobile devices 130,150 work together to send, receive, and manage communications within and beyond the cellular network.

Referring still to FIG. 1, an MTSO 120 serves as a central control center for the base stations 112 operating in a given area. For example, an MTSO 120 may be configured for controlling wireless communications for a wireless service provider operating in a specified city or other suitable operating area or region. In addition to other operating functions of the MTSO, according to embodiments of the present invention, the MTSO 120 may serve as control point for determining, providing and controlling subscriber features. For example, in accordance with embodiments of this invention, a customer information database 160 may contain data to allow a determination as to whether a particular feature or service is provisioned for a given wireless communications device account. An example of such a feature or service may be Caller ID 162, Call Waiting 164, Voicemail 166, or Visual Voicemail 168. Thus, if a caller 132 using mobile device 130 attempts a call to mobile device 150, a customer information database 160 may be parsed to determine which features to provision before completing the connection with a called party 152.

The voicemail platform 140 may comprise a system operative to generate, store and manage audio and text-based voicemail messages as described herein. The voicemail server 142 is a general-purpose computing system operative to assemble and manage data sent to and received from the MTSO 120 via traditional communications links, such as Internet 180 communication links, publicly switched telephone circuits, wireless communications circuits, cable communications circuits, satellite communications circuits and the like. The voicemail server 142 may include a middleware layer 144 for processing and preparing data from a separate transcription service 170, described below.

The visual voicemail browser (VVM browser) 145 is a software module operative to serve as an interface between the called party device and the voicemail platform 140 and index map server 182. According to embodiments, when a called party elects to listen to the audio version of a transcribed voicemail message, the VVM browser 145 is operative to receive the call and to query the index map server 182 (described below) to map the received call with the appropriate voicemail message and to direct the call to the appropriate storage location of the audio voicemail message for direct playback to the called party. In addition, if a called party desires to apply a personal identification number (PIN) to the visual voicemail functionality, described herein, the VVM browser may be operative to request entry of a PIN by the called party and to resolve entered PIN numbers against the identification information stored for the voicemail messages. As should be appreciated, the VVM browser may operate as a standalone server/software system, or the VVM browser may be integrated with the voicemail platform 140.

The voice message conversion system application programming interface (VMCSAPI) 146 is an application programming interface operative for allowing the VVM browser to retrieve desired audio voice messages, as described herein. That is, when a called party desires to listen to an audio voice message from which a text-based voicemail message was transcribed, the VVM browser may query the VMCSAPI for the voicemail message using the telephone number assigned to the stored voicemail message (described below) and the unique identification information assigned to the voicemail message and stored in the pool of directory information described below with respect to FIG. 1B.

As should also be understood, the operation of the VVM browser and VMCSAPI may be simplified by providing in the transcribed message sent to the called party a link that allows the called party device to dial directly to the location within the voicemail platform of the stored audio voicemail message associated with a transcribed voicemail message. The mapping of unique identification information and dialing number to the voicemail message associated with the transcribed message reduces the opportunity for retrieval of erroneous audio files by the called party.

According to the embodiments of the present invention, a transcription service 170 may be an automated message transcribing system, or it may be a message transcribing service provided by persons internal or external to the entity providing Visual Voicemail as described herein. In either case, the transcription service 170 is capable of receiving, processing, and sending data to the voicemail platform 140 and an index map server 182. As should be appreciated, while the transcription service 170 and Index Map Server 182 are illustrated as separate from the voicemail platform 140, either or both of these functions may be housed and performed at the voicemail platform 140.

The index map server 182 may serve as a directory database for providing a mapping between stored voicemail messages, stored transcriptions of voicemail messages and unique telephone number identifications for each message. As described herein, when a transcribed text-based voicemail message is sent to a called or receiving party, a link may be provided to allow the called or receiving party to retrieve a direct playback of the original audio voicemail message from which the text-based voicemail message was transcribed.

Referring to FIG. 1B, a pool of voicemail-to-telephone directory number mappings may be stored in the index map server 182. The pool of directory numbers may be created specifically for a particular visual voicemail system (VVM). While the database shown in FIG. 1 shows only five directory numbers, the pool would be at least equal in size to the maximum number of voice messages allowed by the class of service with the largest number of allowed messages. Each of those numbers would be mapped to a unique index in key-value pair. Each index in the map would correlate to a possible voicemail message ID. All calls to any number within the pool are routed to a voice browser application server, described below to allow the called or receiving party to retrieve a direct playback of an associated audio voicemail file. This directory number-to-index map may be provided to a local or third party transcription service system 170 to use as the basis of determining which telephone number to embed as a link a corresponding transcribed text-based voicemail message. According to one embodiment, the voicemail platform 140 may pass an internal message identification (ID) assigned to each received voicemail message to the local or third party transcription service 170 for creation and embedding of the link that will allow the called or receiving party to retrieve the audio voicemail file via the telephone number associated with the text-based voicemail message.

Referring back to FIG. 1, as briefly described above, if a caller 132 places a call to the called 152 party who is unavailable to receive the call, the call may be routed to the MTSO where the Visual Voicemail feature may be provisioned at the MTSO on the called party's wireless device. Provisioning of Visual Voicemail may or may not be necessary as Visual Voicemail may or may not be a subscribed feature. It may be a standard feature for a wireless device calling plan. As should be appreciated, the originating call may be via a wireline telephone 185 via a public switched telephone network (PSTN) or other suitable wireline telephone system, or the originating call may be received via a cable television services system 400, as described below with respect to FIG. 4.

In any case, as an embodiment of this invention the Visual Voicemail feature may be provisioned for the called mobile device 150, and the received call may be routed to the MTSO and then to the voicemail platform 140 where a voicemail may be deposited for the called party. According to embodiments, the audio voicemail message may be stored, and a unique identification and telephone directory number for the storage location of the audio voicemail message may be updated in a pool of directory numbers associated with the called party's voicemail box, as described above with reference to FIG. 1B.

A copy of the audio voicemail message may then be passed to the local or third party transcription service where the message is transcribed into a text-based message. Examples of such text-based messages include, but are not limited to, SMS (Short Message Service), MMS (Multimedia Service), and/or electronic mail (email). The index map server 182 containing the pool of directory numbers is queried and returns an identification for the transcribed message. As an embodiment of this invention, the identification may become part of the message, may be embedded within the message, and it may be visible or invisible to the end user. In the end, the unique identification remains with the transcribed message as a link to the original voicemail deposited in the voicemail platform. The transcribed message with a unique identification may be returned to the voicemail platform 140 and may be routed via the MTSO to the called party's wireless device for review as a text message by the called or receiving party.

Alternatively, the transcribed message and embedded link may be deposited at the voicemail platform, but may not be sent to the called party's wireless device. Instead, a "wake up" notification may be sent to the called party's wireless device to alert the called party that a voicemail has been received and has been deposited in the called party's voicemail box. If the called party 152 desires to receive the deposited message, a connection may be opened between the called party device and the voicemail platform at which time the text-based message with the embedded link for retrieving the audio message from which it was transcribed may be passed to the called party device as described herein.

According to an alternate embodiment, prior to creation of a text-based transcription of a received voicemail message, a notification of a received voicemail message may be sent to the called party to allow the called party to control whether or not the received voicemail message is transcribed. According to this embodiment, the called party may receive a displayed selectable control or link as described below with reference to FIG. 2 which when selected, causes the voicemail platform 140 to cause the voicemail message to be transcribed as described above. Thus, the called party may exercise control over the transcription process on a message-by-message basis.

At the receiving or called party device 150, the transcribed text-based voicemail message may be displayed to the receiving or called party for review. The end user may select one of a number of communication processing options. Upon selection of a desired option, the selected option may be transmitted from the called party's device 150 back to the voicemail platform for processing. According to one embodiment, the called party may select a link for listening to the original audio message from which the received text message was transcribed. If the called party selects this option, then the selected link which maps to a unique telephone number of the storage location of the original audio voicemail message will allow the called party device 150 to call the storage location to retrieve a direct playback of the desired audio message as described herein.

According to another embodiment, an application program for providing the visual voicemail system described herein runs on a wireless handset (called party device) 150 and presents a selectable list of voicemail messages in an email-like list format, as illustrated below in FIG. 2, with which the user (called party 152) is able see the date, time, calling party and text transcription of voicemail messages deposited for the called party in the called party's mailbox at the voicemail platform 140. Every voicemail message that the user receives may be transcribed into text, as described above. The text is returned from the transcription service (local or third party) to the voicemail platform, and the transcribed text is sent to the handset 150 from the VM platform 140 along with the embedded (telephone number-based) "link" that the user can optionally use to call into and to listen directly to the message in the VM platform from which the text message was transcribed. According to this embodiment, a typical usage includes the called party 152 "reading" most voicemail messages and only using the embedded link to call and to listen to a few messages.

According to yet another embodiment, when a voicemail is received directed to the called party 152, transcription to a text-based message is done "on-demand" from the called party. After a voicemail message is received and is deposited for the called party, a notification may be sent to the called party device 150 to alert the called party of the received audio voice message. A selectable function may be provided to the called party for each such received message (as illustrated and described below in FIG. 2) to allow the called party to request a transcribed text-based version of the received audio voicemail message. Every voicemail message that the user receives has a link phone number created for it and that link phone number plus date/time/calling party metadata is sent to the handset for display to the user via the application program running on the called party device 150. According to this embodiment, typical usage includes the called party listening to most messages via the link phone numbers and perhaps only transcribing a few voicemail messages as needed. The link phone number and date/time/calling party metadata may be sent via an "administrative" SMS (or other suitable) message (not visible to the user via the normal SMS client), and thus, the transcription functionality may be supported by called party devices not associated with expensive data plans. If an "on-demand" text-based message is processed and received, the other functionality described herein allowing the called party to call the voicemail platform to listen to the associated audio message may be available.

Figure 2:
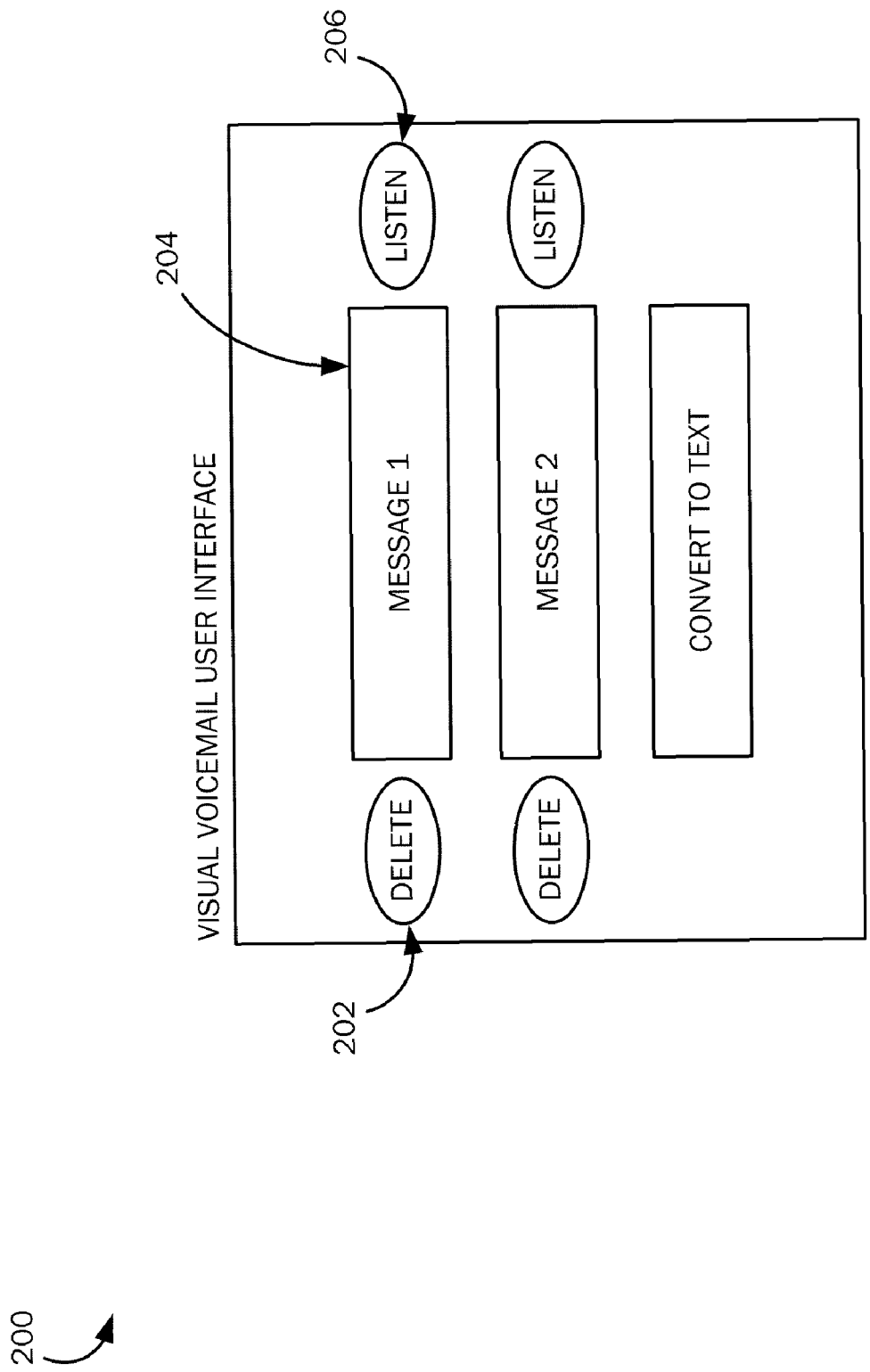
FIG. 2 is a simplified block diagram illustrating an interactive user interface according to the embodiments of the present invention.

Referring now to FIG. 2, a user interface 200 may be displayed on the called party's wireless device 150 (or other suitable communication device) when a communication from a calling party (e.g., a friend, co-worker, business associate, spouse) is received to allow the called party to exercise one or more of the various controls described herein. According to embodiments of the present invention, the Visual Voicemail user interface 200 may be displayed on an LCD touch-screen with pre-programmed pushbuttons or an LCD screen, which is not a touch-screen, but which may be activated using a device keypad, each of which may provide options for processing the visual voicemail.

The visual voicemail user interface 200 may include a general message area 204. For example, the general message area 204 may display the visual voicemail messages from one or more callers 132. That is text-based transcriptions of received voicemail messages may be displayed to the called party to allow the called party to read the received voicemail messages. For example, a transcription of a received voicemail message might read "This is Joe—I will meet you at the game at 7:00 pm." In addition, for each message 204 displayed, other information in addition to the transcribed message may be displayed, such as date and time of the received call, calling party name and telephone number, and the like. According to embodiments, one or more selectable options may be displayed in association with each message for allowing the called party to process the visual voicemail. For example, option 206 may be provided for allowing a user 152 of the device 150 to "Listen" to the voicemail. As described above, selection of this option will cause the called device to place a call directly to the storage location of the associated audio file to allow the called party to listen to the stored audio file. Option 202 may be provided for allowing a user 152 of device 150 to "Delete" the visual voicemail. As should be appreciated by those skilled in the art, the communication disposition options illustrated in FIG. 2 are for purposes of example and are not limiting of other options that may be available according to embodiments of the invention. And, as described above, a "Convert to Text" option may be provided to allow a called party to have received voicemail messages transcribed on a message-by-message "on-demand" basis.

Figure 3:
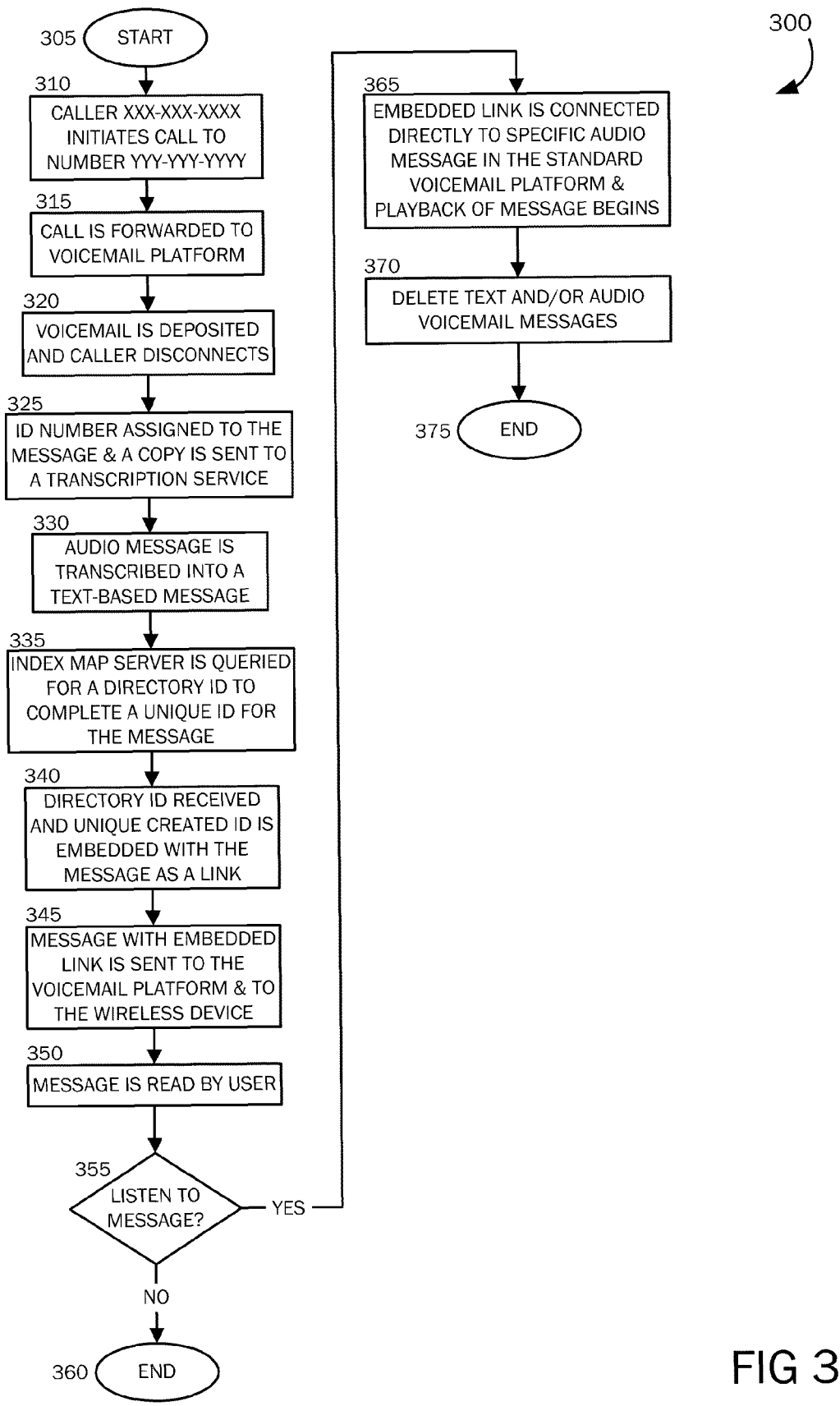
FIG. 3 is a flow diagram showing an illustrative routine for generating a text-based transcript of a deposited voicemail, embedding it with a unique identification, sending it to a wireless communication device, and then retrieving the audio version of the voicemail for direct playback.

Having described an exemplary operating environment 100 with respect to FIGS. 1 and 1B and having described an example visual voicemail user interface 200 with respect to FIG. 2, FIG. 3 is a flow diagram showing an illustrative routine 300 for creating and processing a visual voicemail communication intended for a called party 152.

The routine 300 begins at start block 305 and proceeds to block 310 where a caller 132, identified with telephone number XXX-XXX-XXXX initiates a call intended for a called party 152, identified with telephone number ZZZ-ZZZ-ZZZZ.

At block 315, the call from caller 132 is forwarded to the voicemail platform 140. At block 320, a voicemail message from the called party is deposited and the caller 132 disconnects. At block 325, the voicemail system assigns an identification number to the message and sends a copy of the audio message to a local or third party transcription service 170. According to one embodiment, the voicemail system emails the copy of the audio message to the transcription service. The email includes an identification correlating the voicemail to the received call, an internal identification, for example, ID#1 (see FIG. 1B) and the actual audio file, for example a .WAV file.

At block 330, the audio message is transcribed into a text-based message. At block 335, the transcription service queries the index map server for a directory number identification for the message. At block 340, the transcription service receives the directory number identification, combines it with the previously assigned identification from the voicemail system, and creates a unique identification for the visual voicemail. The unique identification is embedded in the text-based message as a link.

At block 345 the text-based message is sent to the voicemail platform and on to the called party wireless device. Alternatively, the text-based message (transcription) may be sent directly to the called party wireless device without going through the voicemail platform. At block 350, the wireless device user receives and reads the message via a user interface 200, as described above with respect to FIG. 2. At decision block 355, a determination is made by the user 152 via the wireless device user interface 200 to listen to the message. If the user does not wish to listen to the message, the routine ends at block 360. If "Listen" is selected as the option, then at block 365, the embedded link in the message causes the called party device to call the voicemail platform via the unique telephone number assigned to the storage location of the original audio voicemail message from with the received text message was transcribed.

According to an embodiment, the mobile client at the called party device 150 interprets the digits of the embedded link, e.g., 555-555-1212, and asks the MTSO 120 to make the call to the retrieve the audio voicemail message. The MTSO analyzes the dialed digits, and routes the call to a trunk associated with the VVM browser 145. The VVM browser accepts the call and queries the directory-number-to-message index map server 182 using the dial number, e.g., 555-555-1212. The directory-number-to-message index map server 182 returns the internal message ID for the stored audio voicemail message (e.g., ID#1—see FIG. 1B). The VVM browser then queries VMCSAPI 146 using the dialed number and the internal message ID. The VMCSAPI queries the voicemail platform 140 for the message with the appropriate ID in mailbox number 555-555-1212. The voicemail platform returns the audio contents of the message to VMCSAPI. The VMCSAPI returns the audio contents of the message to the VVM browser. The VVM browser plays the audio to the called party requesting the audio voicemail message. The MTSO delivers the audio voicemail message to the called party device 150.

Accordingly, a full directory number is embedded in a SMS, MMS or email sent to the called party device with the transcribed message so that special routing is not required. Mapping is performed on the back end to determine what voicemail message to play. The pool of directory phone numbers is mapped to a particular voicemail message in the voicemail inbox. Users may have several messages in a mailbox at any given time. The combination of the called number and the calling number will be unique and the index of each message will be unique.

Thus, mapping of a called number and a calling number to an index for that particular mailbox provides a unique identification of a particular voicemail message. The voicemail message may be played through a VVM browser. A copy of the audio message may or may not be maintained at the transcription service provider. As mentioned above, a query is performed with a key value. The value may be used to identify how to augment a voicemail message or what value to add to the message. To expand the number of directory numbers, another group of numbers may be added and indexed. This creates an instant synchronization between both sides of the service and still eliminates using up data minutes and the dependency on a data plan by subscribers.

At block 370, the called party may delete the text message displayed on the called party device. If the called party desires to delete the audio voicemail message at the voicemail platform, the called party may do so during the listening process described above, or via interaction with the called party's voicemail box via the voicemail platform outside the operation of the visual voicemail system described herein. The routine ends at block 375.

According to an alternative embodiment, the text-based voicemail message may be transmitted to receiving devices other than a wireless telephone device 150. For example, the transcribed voicemail message may be transmitted to a personal or laptop computing device 197 via a distributed computing environment, such as the Internet 195, as illustrated in FIG. 1. According to this example embodiment, the computing device 197 is operative to receive and display the transcribed voicemail message and to interact with the voicemail platform for retrieval of the playback of the associated audio file. Instead of mapping a telephone number to the audio file storage location, a path may be provided for allowing the computing device 197 to locate the stored audio file for playback on the device 197.

Figure 4:
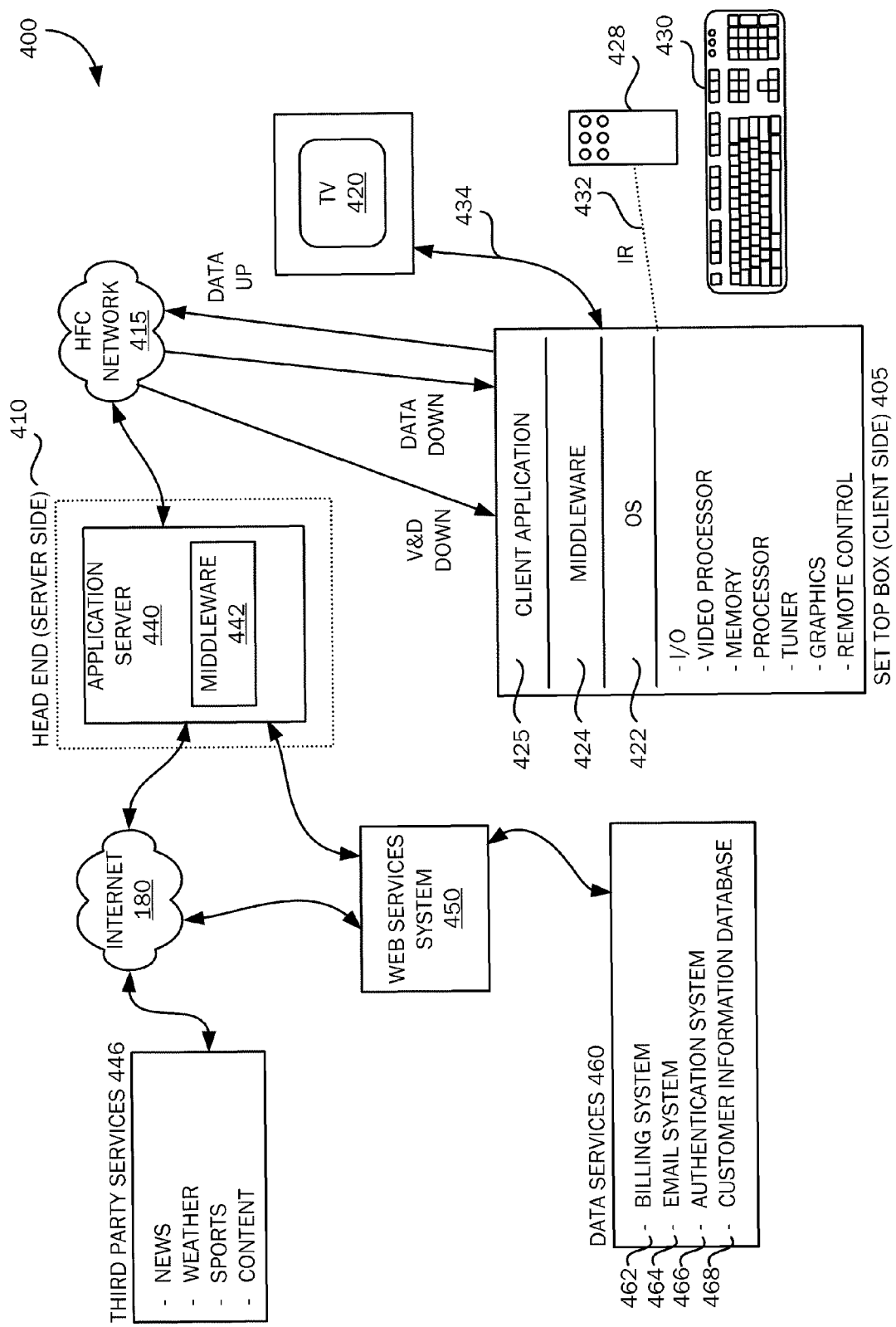
FIG. 4 is a simplified block diagram of a cable services system architecture in which embodiments of the invention may be implemented.

According to yet another alternative embodiment, the transcribed voicemail message may be transmitted to a receiving party via a cable television services system for display via a set-top box (cable services system computing device) and television combination. That is, a receiving party may receive the transcribed voicemail message on a television display screen via the computing functionality of an associated cable services system set-top box, as described below. The set-top box may be configured for communicating with the voicemail platform 140 in a similar manner as described above for the computing device 197. FIG. 4 is a simplified block diagram illustrating a cable services system (hereafter referred to as "CATV") architecture that may serves as an exemplary operating environment for this embodiment. Communication between the wireless communication system illustrated in FIG. 1 and the CATV system illustrated in FIG. 4 may be accomplished via any suitable wireline or wireless connectivity between the wireless communication system and the CATV system.

Referring now to FIG. 4, digital and analog video programming, information content and interactive television services are provided via a hybrid fiber coax (HFC) network 415 to a television set 420 for consumption by a cable television/services system customer. As is known to those skilled in the art, HFC networks 415 combine both optical fiber and coaxial cable lines. Typically, optical fiber runs from the cable head end 410 to neighborhoods of 500 to 2,000 customers. Coaxial cable runs from the optical fiber feeders to each customer. According to embodiments of the present invention, the functionality of the HFC network 415 allows for efficient bidirectional data flow between the client-side set-top box 405 and the server-side application server 440 of the present invention.

According to embodiments of the present invention, the CATV system 400 is in the form of a distributed client-server computing system for providing video and data flow across the HFC network 415 between server-side services providers (e.g., cable television/services providers) via a server-side head end 410 and a client-side customer via a client-side set-top box (STB) functionally connected to a customer receiving device, such as the television set 420. As is understood by those skilled in the art, modern CATV systems 400 may provide a variety of services across the HFC network 415 including traditional digital and analog video programming, telephone services, high speed Internet access, video-on-demand, and information services.

On the client side of the CATV system 400, digital and analog video programming and digital and analog data are provided to the customer television set 420 via the set-top box (STB) 405. Interactive television services that allow a customer to input data to the CATV system 400 likewise are provided by the STB 405. As illustrated in FIG. 4, the STB 405 is a multipurpose computing device having a computer processor, memory and an input/output mechanism. The input/output mechanism receives input from server-side processes via the HFC network 415 and from customers via input devices such as the remote control device 428 and the keyboard 430. The remote control device 428 and the keyboard 430 may communicate with the STB 405 via a suitable communication transport such as the infrared connection 432. The STB 405 also includes a video processor for processing and providing digital and analog video signaling to the television set 420 via a cable communication transport 434. A multichannel tuner is provided for processing video and data to and from the STB 405 and the server-side head end system 410, described below.

The STB 405 also includes an operating system 422 for directing the functions of the STB 405 in conjunction with a variety of client applications 426. For example, if a client application 425 requires a news flash from a third-party news source to be displayed on the television 420, the operating system 422 may cause the graphics functionality and video processor of the STB 405, for example, to output the news flash to the television 420 at the direction of the client application 426 responsible for displaying news items.

Because a variety of different operating systems 422 may be utilized by a variety of different brands and types of set-top boxes, a middleware layer 424 is provided to allow a given software application to be executed by a variety of different operating systems. According to an embodiment of the present invention, the middleware layer 424 may include a set of application programming interfaces (API) that are exposed to client applications 426 and operating systems 422 that allow the client applications to communicate with the operating systems through common data calls understood via the API set. As described below, a corresponding middleware layer is included on the server side of the CATV system 400 for facilitating communication between the server-side application server and the client-side STB 405. According to one embodiment of the present invention, the middleware layer 442 of the server-side application server and the middleware layer 424 of the client-side STB 405 format data passed between the client side and server side according to the Extensible Markup Language (XML).

The set-top box 405 passes digital and analog video and data signaling to the television 420 via a one-way communication transport 434. The STB 405 may receive video and data from the server side of the CATV system 400 via the HFC network 415 through a video/data downlink and data via a data downlink. The STB 405 may transmit data from the client side of the CATV system 400 to the server side of the CATV system 400 via the HFC network 415 via one data uplink. The video/data downlink is an "in band" downlink that allows for digital and analog video and data signaling from the server side of the CATV system 400 through the HFC network 415 to the set-top box 405 for use by the STB 405 and for distribution to the television set 420. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 4, between the HFC network 415 and the set-top box 405 comprise "out of band" data links. As is understand by those skilled in the art, the "out of band" frequency range generally lies between zero and 54 megahertz. According to embodiments of the present invention, data flow between the client-side set-top box 405 and the server-side application server 440 is typically passed through the "out of band" data links. Alternatively, an "in band" data carousel may be positioned in an "in band" channel into which a data feed may be processed from the server-side application server 440 through the HFC network 415 to the client-side STB 405. Operation of data transport between components of the CATV system 400, described with reference to FIG. 4, is well known to those skilled in the art.

According to one embodiment data passed between the CATV system backend components such as the head end 410 and the CATV system front end components such as the STB 405 may be passed according to the Data Over Cable Service Interface Specification (DOCSIS). As is well known to those skilled in the art, DOCSIS provides for a mechanism for data transport over a cable system such as the CATV 400, illustrated in FIG. 4. Among other things, DOCSIS allows for the passing of digital communications and Internet connectivity over an HFC network 415.

Referring still to FIG. 4, the head end 410 of the CATV system 400 is positioned on the server side of the CATV system and includes hardware and software systems responsible for originating and managing content for distributing through the HFC network 415 to client-side STBs 405 for presentation to customers via televisions 420. As described above, a number of services may be provided by the CATV system 400, including digital and analog video programming, interactive television services, telephone services, video-on-demand services, targeted advertising, and provision of information content.

The application server 440 is a general-purpose computing system operative to assemble and manage data sent to and received from the client-side set-top box 405 via the HFC network 415. As described above with reference to the set-top box 405, the application server 440 includes a middleware layer 442 for processing and preparing data from the head end of the CATV system 400 for receipt and use by the client-side set-top box 405. For example, the application server 440 via the middleware layer 442 may obtain data from third-party services 446 via the Internet 440 for transmitting to a customer through the HFC network 415 and the set-top box 405. For example, a weather report from a third-party weather service may be downloaded by the application server via the Internet 444. When the application server 440 receives the downloaded weather report, the middleware layer 442 may be utilized to format the weather report for receipt and use by the set-top box 405. According to one embodiment of the present invention, data obtained and managed by the middleware layer 442 of the application server 440 is formatted according to the Extensible Markup Language and is passed to the set-top box 405 through the HFC network 415 where the XML-formatted data may be utilized by a client application 426 in concert with the middleware layer 424, as described above. As should be appreciated by those skilled in the art, a variety of third-party services data, including news data, weather data, sports data and other information content may be obtained by the application server 440 via distributed computing environments such as the Internet 444 for provision to customers via the HFC network 415 and the set-top box 405.

According to embodiments of the present invention, the application server 440 obtains customer profile data from services provider data services 460 for preparing a customer profile that may be utilized by the set-top box 405 for tailoring certain content provided to the customer. According to an embodiment of the present invention, a customer profile may include communications applications provisioned on networked STBs, as well as, designations of individual STBs in a home, business or facility (e.g., "kitchen STB," "bedroom STB," "office STB," and the like).

As illustrated in FIG. 4, the services provider data services 460 include a number of services operated by the services provider of the CATV system 400 which may include data on a given customer. For example, a billing system 462 may include information such as a customer's name, street address, business identification number, Social Security number, credit history, and information regarding services and products subscribed to by the customer. An electronic mail system 464 may contain information such as electronic mail addresses, high-speed Internet access subscription information and electronic mail usage data. An authentication system 466 may include information such as secure user names and passwords utilized by customers for access to network services. The customer information database 468 may include general information about customers such as place of employment, business address, business telephone number and demographic information such as age, gender, educational level, and the like. As should be understood by those skilled in the art, the disparate data services systems 462, 464, 466, 468 are illustrated as a collection of data services for purposes of example only. The example data services systems comprising the data services 460 may operate as separate data services systems, which communicate with a web services system (described below) along a number of different communication paths and according to a number of different communication protocols.

Referring still to FIG. 4, a web services system 450 is illustrated between the application server 440 and the data services 460. According to embodiments of the present invention, the web services system 450 serves as a collection point for data requested from each of the disparate data services systems comprising the data services 460. When the application server 440 requires customer profile data from one or more of the data services 460 for preparation or update of a customer profile, the application server 440 passes a data query to the web services system 450. The web services system formulates a data query to each of the available data services systems for obtaining any available data for a given customer as identified by a set-top box identification associated with the customer. The web services system 450 serves as an abstraction layer between the various data services systems and the application server 440. That is, the application server 440 is not required to communicate with the disparate data services systems, nor is the application server 440 required to understand the data structures or data types utilized by the disparate data services systems. The web services system 450 is operative to communicate with each of the disparate data services systems for obtaining necessary customer profile data. The customer profile data obtained by the web services system is assembled and is returned to the application server 440 for ultimate processing via the middleware layer 442, as described above.

As described herein, methods and systems are provided for allowing a user of a wireless communication device or other suitable communication device to receive and review transcribed voicemail messages in text format and for allowing the user to access associated audio versions of transcribed voicemail messages without the need for accessing a voicemail system to cycle through various prompts and stored voicemail messages. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of providing playback of an audio voicemail message corresponding to a visual voicemail message; comprising:
    receiving a voice call at a voicemail system directed to a called party device;
    storing an audio voicemail message at the voicemail system;
    sending a copy of the stored voicemail message to a transcription service;
    transcribing the copy of the stored voicemail message into a text-based voicemail message;
    embedding the text-based voicemail message with a unique identification for accessing the stored audio voicemail message;
    sending the text-based voicemail message to the called party device;
    at the called party device, receiving an instruction for playing the stored audio voicemail message at the called party device;
    from the called party device, calling a unique directory number associated with the unique identification for accessing the stored audio voicemail message; and
    in response to calling the unique directory number associated with the unique identification for accessing the stored audio voicemail message, playing the stored audio voicemail message at the called party device.

2. The method of claim 1, after sending the text-based voicemail message to the called party device, displaying the text-based voicemail message on the called party device for review by a called party.

3. The method of claim 1, wherein receiving an instruction for playing the stored audio voicemail message at the called party device includes receiving a selection of a selectable control at the called party device for placing a call to the unique directory number associated with a location of the stored audio voicemail message.

4. The method of claim 1, wherein storing an audio voicemail message at the voicemail system includes assigning an identification to the stored audio voicemail message.

5. The method of claim 4, wherein sending a copy of the stored voicemail message to a transcription service includes sending the identification assigned to the stored audio voicemail message.

6. The method of claim 5, wherein prior to embedding the text-based voicemail message with a unique identification for accessing the stored audio voicemail message, querying an index map server for the unique identification for accessing the stored audio voicemail message.

7. The method of claim 6, further comprising generating the unique identification for the text-based voicemail message using the unique directory number of a calling party device associated with the stored audio voicemail message, a directory number of the called party device, and the identification assigned to the stored audio voicemail message.

8. The method of claim 7, further comprising, at the transcription service, composing the text-based voicemail as a short message service (SMS) message for delivery to the called party device.

9. The method of claim 7, further comprising, at the transcription service, composing the text-based voicemail as a multimedia service (MMS) message for delivery to the called party device.

10. The method of claim 7, further comprising, at the transcription service, composing the text-based voicemail as an electronic mail message for delivery to the called party device.

11. The method of claim 7, wherein after calling the unique directory number associated with the unique identification for accessing the stored audio voicemail message, further comprising
intercepting the call to the unique directory number associated with the unique identification for accessing the stored audio voicemail message at a visual voicemail browser; and
at the visual voicemail browser, querying an index map server using the unique directory number associated with the unique identification for accessing the stored audio voicemail message for an internal message identification associated with the stored audio voicemail message.

12. The method of claim 11, further comprising
at the visual voicemail browser, querying a voice message conversion system application programming interface (VMCSAPI) with the unique directory number associated with the unique identification for accessing the stored audio voicemail message and the internal message identification associated with the stored audio voicemail message;
querying the voicemail system via the VMCSAPI for the stored audio voicemail message; and
returning the stored audio voicemail message via the VMCSAPI to the visual voicemail browser.

13. The method of claim 12, further comprising passing the stored audio voicemail message from the visual voicemail browser to the called party device for playing the stored audio voicemail message at the called party device.

14. The method of claim 13, wherein passing the stored audio voicemail message from the visual voicemail browser to the called party device for playing the stored audio voicemail message at the called party device includes passing the stored audio voicemail message from the visual voicemail browser to the called party device via a mobile telephone switching office.

15. The method of claim 13, wherein passing the stored audio voicemail message from the visual voicemail browser to the called party device for playing the stored audio voicemail message at the called party device includes passing the stored audio voicemail message from the visual voicemail browser to the called party device via a cable television services system wherein the called party device is a cable television services system set-top box.

16. The method of claim 13, wherein passing the stored audio voicemail message from the visual voicemail browser to the called party device for playing the stored audio voicemail message at the called party device includes passing the stored audio voicemail message from the visual voicemail browser to the called party device via a distributed computing network wherein the called party device is a multipurpose computing device.

17. A system for providing playback of an audio voicemail message corresponding to a visual voicemail message; comprising:
a voicemail system operative
to receive a voice call directed to a called party device;
to store an audio voicemail message;
to send a copy of the stored voicemail message to a transcription service;
a transcription service operative
to transcribe the copy of the stored voicemail message into a text-based voicemail message;
to embed the text-based voicemail message with a unique identification for accessing the stored audio voicemail message;
to send the text-based voicemail message to the called party device;
a visual voicemail browser operative
to receive an instruction from a called party device for playing the stored audio voicemail message at the called party device;
to query an index map server for an internal message identification associated with the stored audio voicemail message;
to query an application programming interface using the internal message identification for the stored audio voicemail message;
to receive the stored audio voicemail message via the application programming interface; and
to play the stored audio voicemail message at the called party device.

18. The system of claim 17, wherein the transcription service is further operative to compose the text-based voicemail as a short message service (SMS) message for delivery to the called party device.

19. The system of claim 17, wherein the transcription service is further operative to compose the text-based voicemail as a multimedia service (MMS) message for delivery to the called party device.

20. A non-transitory computer readable medium containing computer executable instructions which when executed by a computer perform a method of providing playback of an audio voicemail message corresponding to a visual voicemail message; comprising:
receiving a voice call at a voicemail system directed to a called party device;
storing an audio voicemail message at the voicemail system;
sending a copy of the stored voicemail message to a transcription service;
transcribing the copy of the stored voicemail message into a text-based voicemail message;
embedding the text-based voicemail message with a unique identification for accessing the stored audio voicemail message;
sending the text-based voicemail message to the called party device;
at the called party device, receiving an instruction for playing the stored audio voicemail message at the called party device;
from the called party device, calling a unique directory number associated with the unique identification for accessing the stored audio voicemail message; and
in response to calling the unique directory number associated with the unique identification for accessing the stored audio voicemail message, playing the stored audio voicemail message at the called party device.

* * * * *